US007065321B2

(12) United States Patent
Lim

(10) Patent No.: US 7,065,321 B2
(45) Date of Patent: Jun. 20, 2006

(54) METHOD AND APPARATUS OF USING SATELLITES TO AUGMENT TRAFFIC CAPACITY OF A WIRELESS NETWORK INFRASTRUCTURE

(75) Inventor: Samuel Lim, Santa Monica, CA (US)

(73) Assignee: The Boeing Company, Seattle, WA (US)

( * ) Notice: Subject to any disclaimer, the term of this patent is extended or adjusted under 35 U.S.C. 154(b) by 592 days.

(21) Appl. No.: 09/919,043

(22) Filed: Jul. 31, 2001

(65) Prior Publication Data

US 2003/0027523 A1    Feb. 6, 2003

(51) Int. Cl.
*H04B 7/19* (2006.01)

(52) U.S. Cl. .................... 455/13.2; 455/430; 455/12.1; 455/452.2

(58) Field of Classification Search ............. 455/12.1, 455/427, 13.1, 13.2, 13.3, 428, 429, 430, 455/13.4, 15, 16, 18, 19, 21, 3.02, 412.2, 455/17, 450, 452.2, 452.1, 453, 517; 370/316, 370/329
See application file for complete search history.

(56) References Cited

U.S. PATENT DOCUMENTS

| 5,555,443 | A  | * | 9/1996  | Ikehama .................. 455/12.1 |
| 5,924,014 | A  | * | 7/1999  | Vanden Heuvel et al. . 455/13.1 |
| 6,377,561 | B1 | * | 4/2002  | Black et al. ................. 370/330 |
| 6,493,538 | B1 | * | 12/2002 | Jabbarnezhad ............. 455/12.1 |
| 6,584,082 | B1 | * | 6/2003  | Willis et al. ................ 455/427 |
| 6,650,869 | B1 | * | 11/2003 | Kelly et al. ................ 455/13.2 |
| 2001/0048672 | A1 | * | 12/2001 | Okunishi et al. ........... 370/316 |

* cited by examiner

*Primary Examiner*—Tilahun Gesesse
*Assistant Examiner*—John J. Lee
(74) *Attorney, Agent, or Firm*—Gates & Cooper LLP

(57) ABSTRACT

A system and method for augmenting a wireless communication network to provide at least a portion of digital data to a user is disclosed. The method comprises the steps of receiving the portion of the digital data in a satellite receiver, providing the received portion of the digital data to at least one of a plurality of terrestrial receivers which form the wireless communication network, and transmitting the received portion of the digital data to a user within a service region using the terrestrial transmitter. The apparatus comprises a satellite antenna, for receiving a signal having at least a portion of the data from a satellite, and a satellite receiver, communicatively coupled to the satellite antenna for detecting and demodulating the signal to produce a portion of the digital data, the satellite receiver communicatively coupled to a terrestrial transmitter in a terrestrial wireless communication network.

24 Claims, 7 Drawing Sheets

METHOD AND APPARATUS OF USING SATELLITES TO AUGMENT TRAFFIC CAPACITY OF A WIRELESS NETWORK INFRASTRUCTURE

BACKGROUND OF THE INVENTION

1. Field of the Invention

The present invention relates to systems and methods for wireless data transmission, and in particular to a system and method for increasing the network capacity by augmenting an existing wireless transmission network with a satellite transmission system.

2. Description of the Related Art

In recent years, there has been an increased demand for high bandwidth transmission of digital data such as video and audio media to remote, and particularly, mobile users. One way to provide such a service is to design and deploy a new mobile communication system that supports high-bandwidth data transmission. Unfortunately, with current technology, such a system is prohibitively expensive. Existing mobile communication infrastructures may also be used, but such systems are designed primarily for low bandwidth voice communication and are poorly suited for high bandwidth data transmission. The current method of augmenting traffic capacity with such systems is to lease additional wireline capacity when traffic loading exceeds current throughput capacity. While this solution is effective for personalized data and voice traffic, it is not a good solution for multimedia content. What is needed is a system that provides high bandwidth data transmission at a reasonable cost by using, to the extent possible, existing communication infrastructures. The present invention satisfies that need.

SUMMARY OF THE INVENTION

To address the requirements described above, the present invention discloses a system and method for augmenting a wireless communication network to provide at least a portion of digital data to a user. The method comprises the steps of receiving the portion of the digital data in a satellite receiver, providing the received portion of the digital data to at least one of a plurality of terrestrial base stations which form the wireless communication network, and transmitting the received portion of the digital data to the a user within a service region using the terrestrial base stations. The apparatus comprises a satellite antenna, for receiving a signal having at least a portion of the data from a satellite, and a satellite receiver, communicatively coupled to the satellite antenna for detecting and demodulating the signal to produce a portion of the digital data, the satellite receiver communicatively coupled to a terrestrial base stations in a terrestrial wireless communication network.

The foregoing uses satellite transponders to augment the backhaul traffic capacity of existing and future wireless communication networks infrastructures. Satellites are used to broadcast/multicast/narrowcast data directly to cell towers of a wireless network. This extends the hybrid satellite/terrestrial networks to include a wireless segment, and provides a cost effective utilization of wireless, fiber, and satellite capacity.

By incorporating a satellite network as a part of a wireless infrastructure, content distributors can bypass traffic congestion and expensive terrestrial leased lines that link content providers with thousands of cell sites. Since most traffic is asymmetric, with more data going out to cell towers than vice versa, satellite connectivity is a cost effective means for placing content and application to the users in cells of the wireless network.

The foregoing is particularly applicable for streaming multimedia content. Further, since it does not require the addition of more terrestrial communication capacity, the owners of existing wireless communication networks can defer expensive upgrades that would otherwise be required and accelerate the introduction of new broadband service offerings, permitting greater market share.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
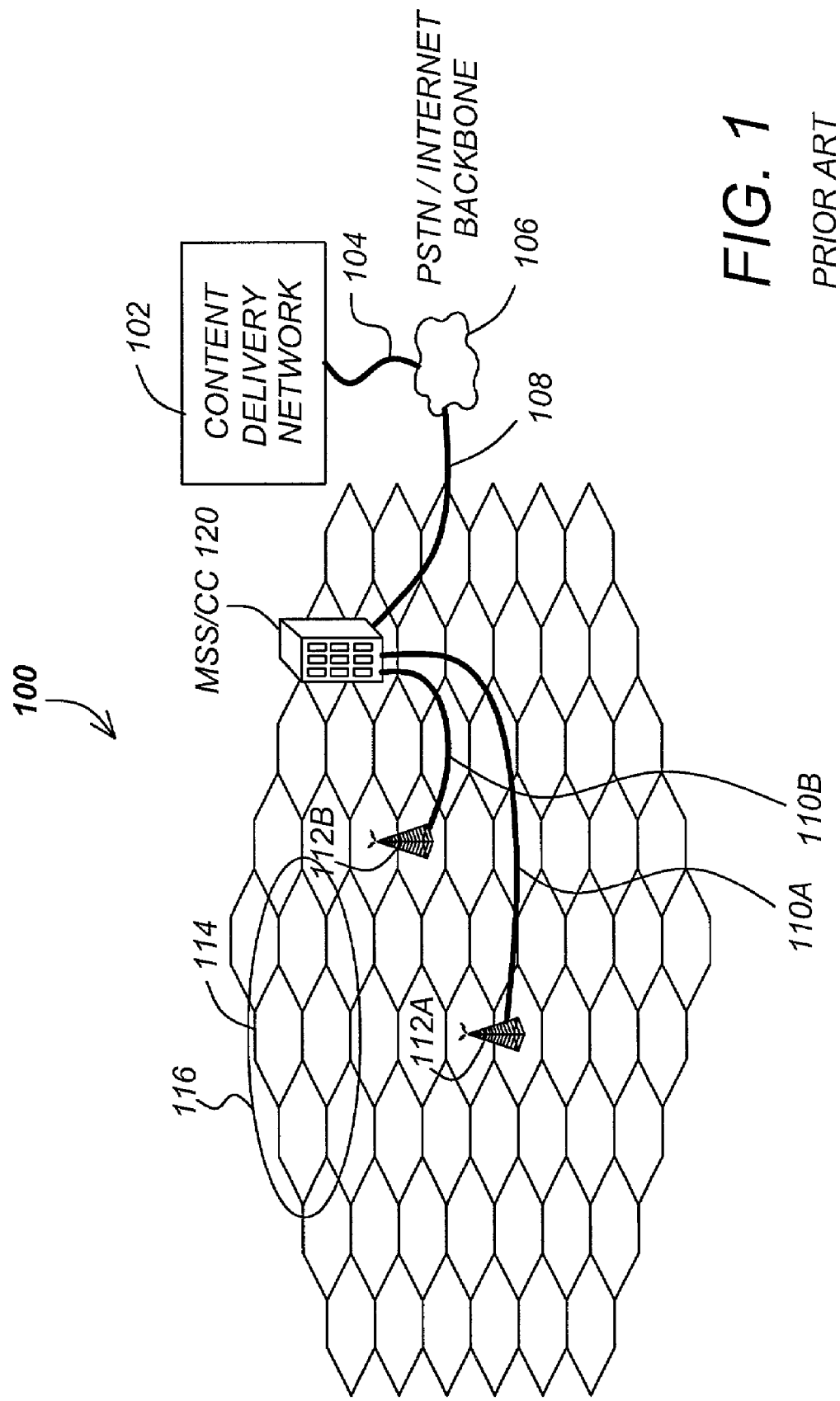
FIG. 1 is a block diagram showing a prior art wireless communication network.

FIG. 1 is a diagram showing a prior art wireless communication network 100 (WCN). The WCN includes a content delivery network (CDN) 102 that provides the digital data that is to be delivered to users. The data may include digital media program material such as digital movies, photographs, or audio, computer programs or data, web pages, and similar information. The content delivery network 102 is communicatively coupled to a public switched telephone network (PSTN) and/or an Internet backbone (PSTN/IB) 106. The PSTN/IB is in communication with a mobile switching station/control center (MSS/CC) 120 via communication link 108. The MSS/CS 120, switches the data from the CDN 102 to one or more of a plurality of base stations 112A and 112B (hereinafter alternatively referred to as base stations 112) via communication paths 110A and 110B, respectively. Each base station 112 services a geographical area 114, by transmitting the data to users with receivers within the service area. In one embodiment, the WCN is a cellular telephone network, and the geographical area 114 is a cell. The base station 112 includes a terrestrial receiver, for receiving transmissions from users, and a terrestrial transmitter for transmitting information to users, and provide a communication link through the MSS 120 to an external network such as the PSTN.

One difficulty with the prior art WCN 100 is bandwidth. That is, the WCN 100 that it is not well suited for the delivery of large amounts of data (e.g. digital movies, audio or photographs) to users over small periods of time. This is due to a number of factors, but one such factor is the limited bandwidth available on communication links 108, 110, and in 106. Since each service region 114 may include a large number of users, each demanding a significant amount of bandwidth, communication links 108 and 110 can limit throughput. Further, although communication links 108 and 110 can be augmented with additional capacity, such modifications are expensive, and in many cases prohibitively so, particularly in areas with large variances in bandwidth demand.

Figure 2:
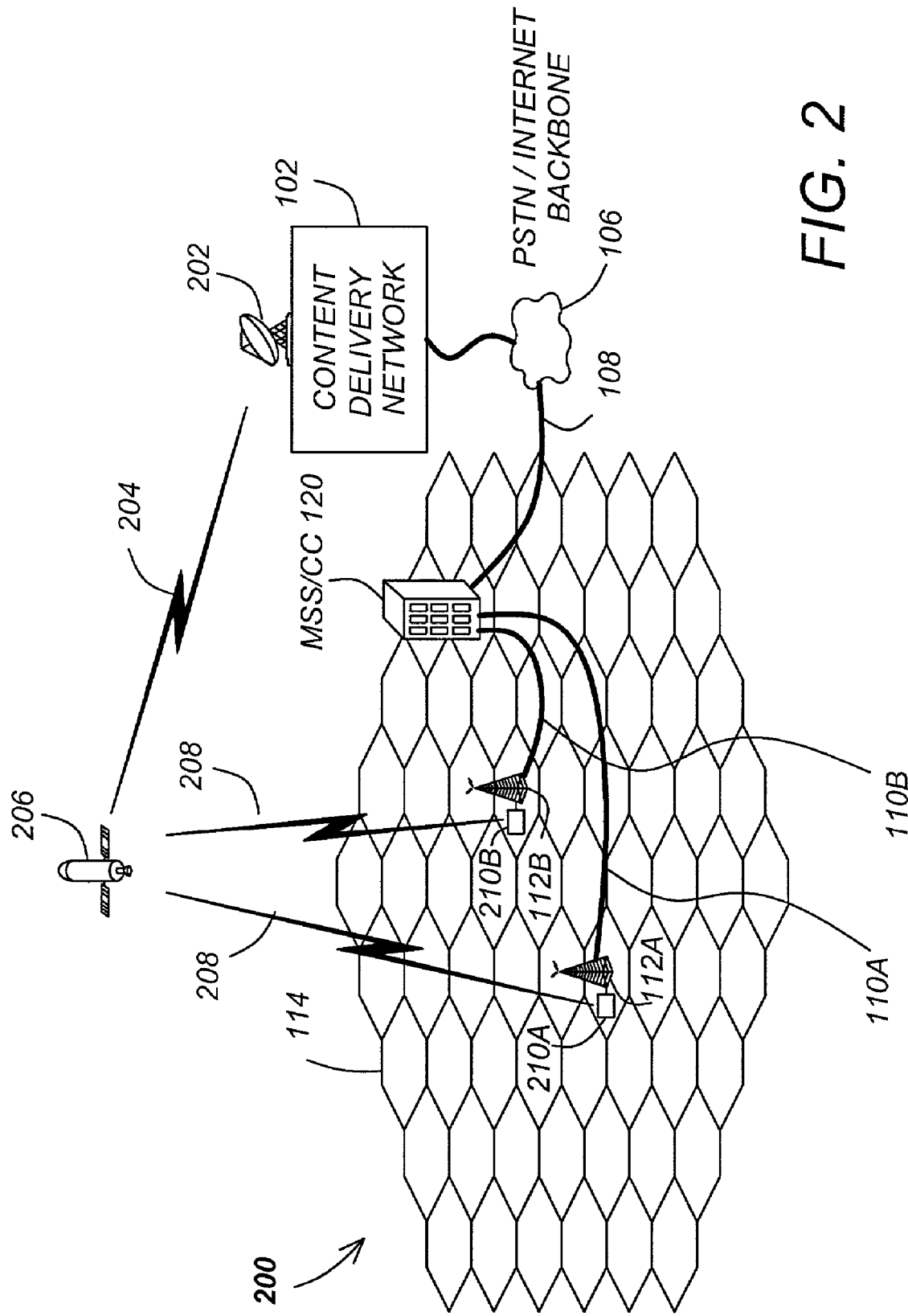
FIG. 2 is a diagram of a wireless communication augmented by a satellite segment.

FIG. 2 is a diagram of an augmented wireless control network (AWCN) 200. The AWCN comprises a communication link 204 from the CDN 102 to a satellite 206. The satellite 206 is typically a geosynchronous satellite such as that which is used to provide direct television broadcasts and broadband data to users with satellite signal receiving equipment. Signals from the CDN 102 are transmitted to the satellite via an uplink station 202 that can be co-located at the CDN 102, or remote from the CDN 102. In a typical embodiment, the satellite 206 includes a plurality of transponders, each of which can be used to relay data from the uplink 204 to the user. Alternatively, the uplink 204 signal can be received and processed by the satellite 206 before transmission to the ground stations 210A and 210B (hereinafter collectively referred to as ground stations 210). The ground stations 210 are communicatively coupled to the base stations 112. Data received by the ground stations 210 is provided to the base stations 112 and thereafter transmitted to users.

By bypassing the PSTN/IB 106, and communication links 108, 110, the ACWM 200 depicted in FIG. 2 ameliorates the communication bottlenecks associated with the limited transmission capacity of such links.

The present invention can be practiced in several embodiments. In a first embodiment, the satellite 206 of the AWCN 200 transmits data requested by a particular user to a plurality of ground stations 210 and service areas 114, without regard to whether the user is located within any particular service area. The data is then provided to the base stations 112 and for transmission to the user. In one embodiment, the base station 112 transmits the data without regard for whether the requesting user is within or near the service area 114. In another embodiment, each base station 112 is aware of whether the user requesting the data is disposed within the service area 114 serviced by the base station (whether from locally available data or from information provided by the MSS 120), and only transmits the data if the user has been determined to be within or proximate to the boundaries of the service area 114 of that particular transmitter. Such information is typically available in a cellular communications system, such as a cellular telephone network.

Figure 3:
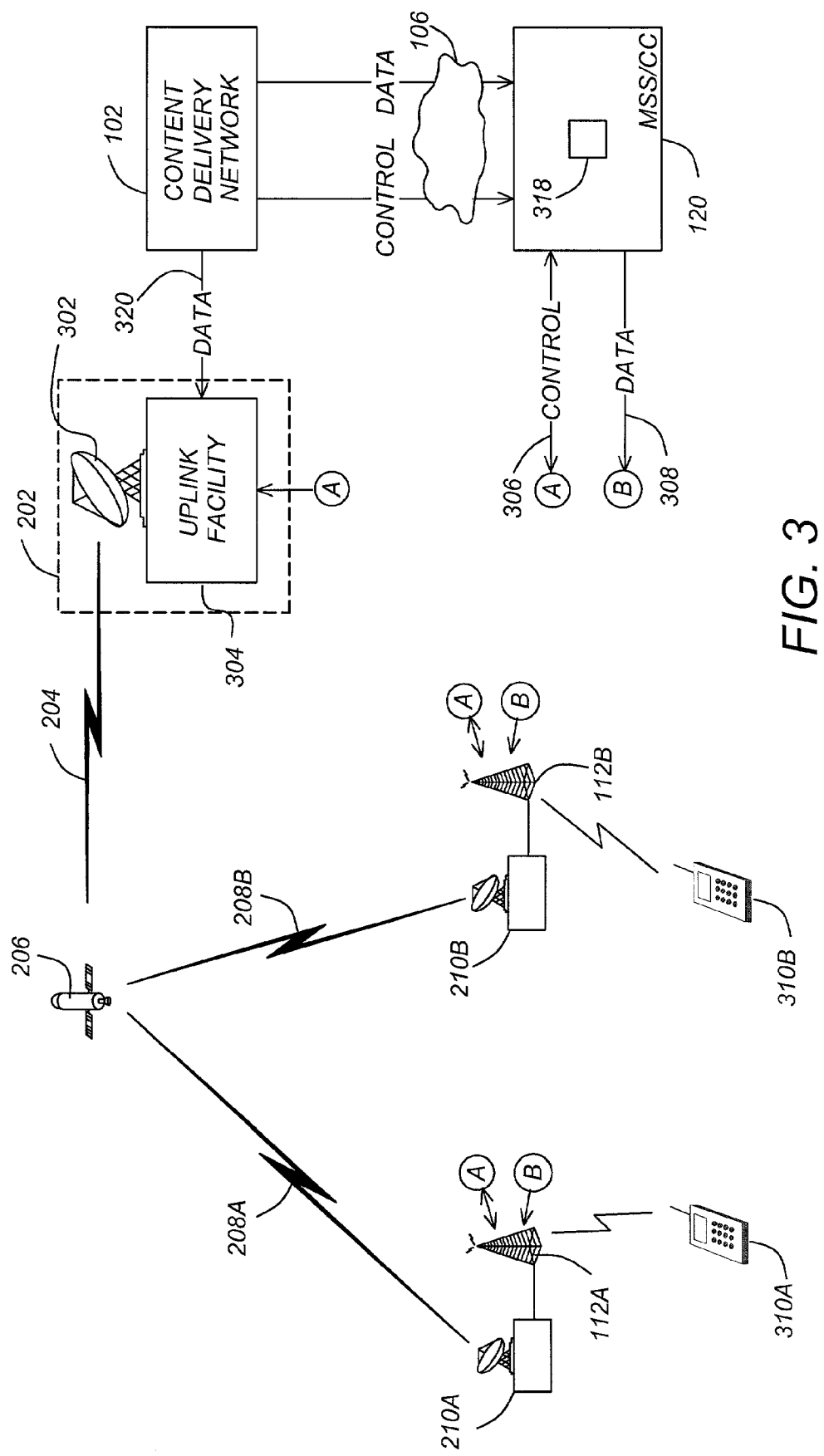
FIG. 3 is a diagram presenting an embodiment of the augmented wireless communication network in which the satellite segment directs the data to the user's service area.

FIG. 3 is a diagram presenting another embodiment of the present invention. In this embodiment, the satellite 206 and associated systems of the AWCN 200 is aware of which service area 114 the user requesting the data is located, and the data is transmitted from the satellite 206 only to the ground station 210 that services the cell 114 in which the user is located. This embodiment provides additional transmission capacity and security from the satellite 206 to the ground stations 210, but that the satellite 206 and associated control equipment be provided with information regarding the service area 116 in which the user is located. This information can be provided by the MSS/CC 120. Alternatively, the data may be transmitted to each of the ground stations 210 servicing a plurality of cells 114 that together define a larger service area 116. This embodiment reduces the amount and/or frequency of information updates regarding the location of the user.

In AWCN 200, data is provided from the content provider/CDN 102 via the PSTN/IB 106 to the MSS/CC 120 or is provided (preferably by an independent communications link) to the uplink station 202. Control information (identifying the user that is to receive the data) is also provided from the content provider/CDN 102 to the MSS/CC 120. The service area 114 in which the user is located is determined from control information provided by the base stations 112 to the MSS/CC 120 by control link 306. The MSS/CC 120 routes the data via link 308 to the base station 112 servicing the service region 114 where the user is located. The base station 112 receives the information, and transmits it to the users. The user may receive the information on a data reception/presentation device (DRPD) 310 such as a cell phone, computer, personal data assistant (PDA), pager, or similar device.

If the satellite segment of the AWCN 200 is to be used, data is provided from the CDN 102 to the uplink station 202. The uplink station 202 includes an uplink facility 304 and an uplink transmitter 302 for communicating the data to the satellite 206. In the embodiment illustrated in FIG. 3, the satellite transmits the data only to ground stations 210 associated with the service regions 114 in which the user is located, or to ground stations in adjacent service regions, if the user is near the periphery of a service region 114. To accomplish this, the uplink station 202 obtains information regarding the current and predicted service area 114 for the user from the MSS/CC 120. This information is used to identify which satellite 206 receives the data (if multiple satellites serving different regions are employed), and if the satellite 206 has beam steering capability, where the beam should be steered to transmit the data to the appropriate ground station 210. In the example illustrated in FIG. 3, the satellite transmits data intended for data reception/presentation device DRPD 310A via link 208A, and data intended for DRPD 310B via link 208B.

In one embodiment, the satellite segment of the AWCN 200 is used to transmit data to the users only when the transmission capacity of the WCN 100 is insufficient to do so. This is determined by a processor 318 at the MSS/CC 120 by comparing a characteristic of the data to be transmitted (size, throughput requirement, minimum quality of service, cost of service) with a transmission characteristic of the WCN 100.

In another embodiment, a portion of the data is transmitted to the user via the WCN 100 and another portion is transmitted via the AWCN 200. The allocation between the WCN 100 and the AWCN 200 can be determined from an analysis and comparison of current and/or predicted transmission capacity and data characteristics. Further, such allocation can be determined based on the type of data requested. For example, frequently viewed web pages shared by many users in service area 114 are often cached at the base station 112, and lead to reduced transmission capacity requirement. An allocation algorithm can therefore allocate web pages unique to a given user to the WCN 100 and frequent and commonly requested web pages to the satellite segment and cache at the base station 112. Such analysis can be performed by a processor 318 in the MSS/CC 120, the uplink facility 304, the CDN 102, or elsewhere.

The present invention can also be used to provide data from the MSS/CS 120 to the uplink station 202 for satellite transmission to ground stations 210, base stations 112 and thence to users. This embodiment reduces throughput limitations in communication links 110 shown in FIG. 2, but not 108.

The present invention can also be used to provide data from the uplink station 202 just to MSS/CC 120 and not to ground stations 210. This embodiment reduces throughput limitations in communication link 108 shown in FIG. 2, but not 110.

Figure 4:
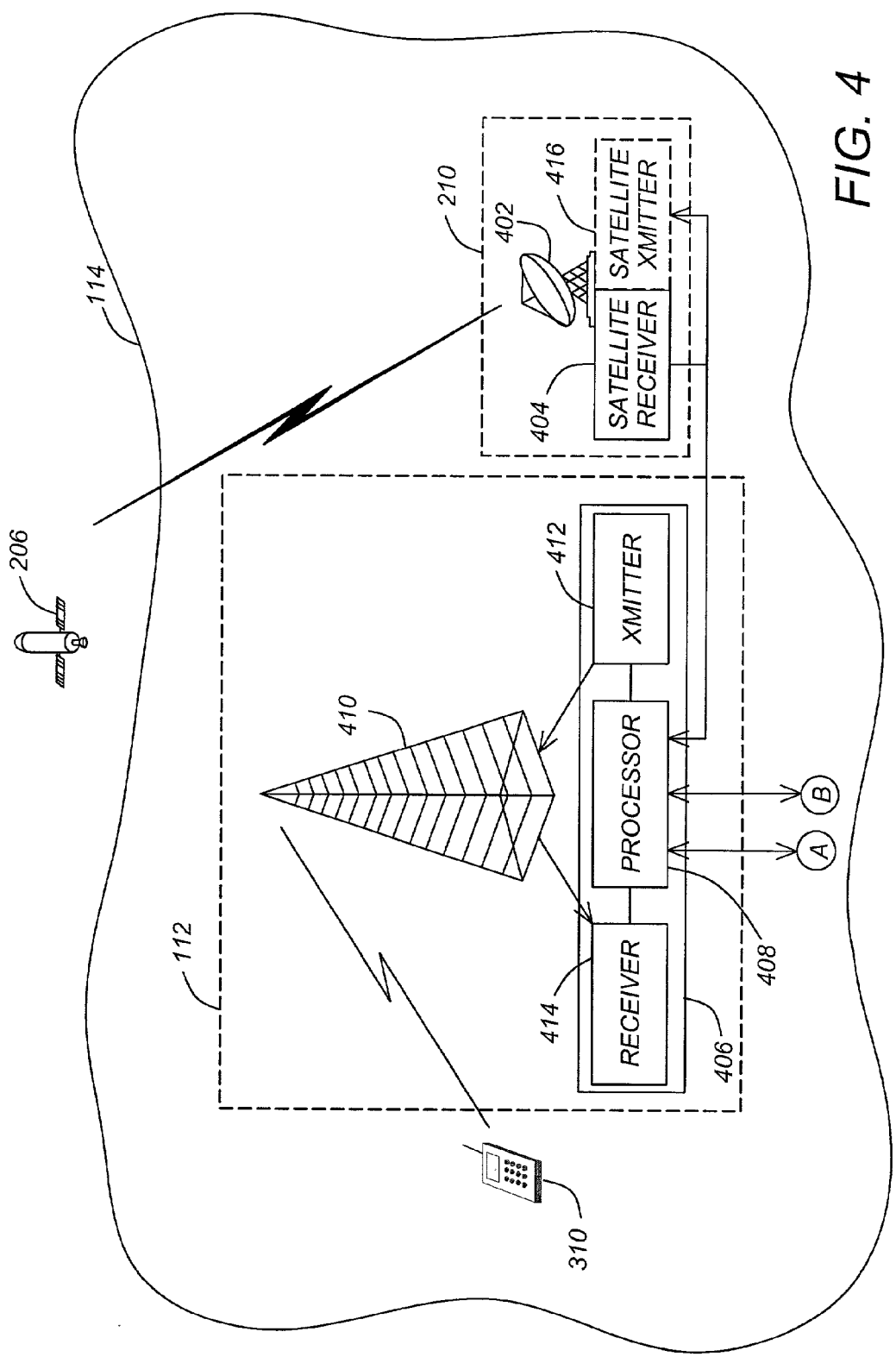
FIG. 4 is a diagram showing further detail of the terrestrial station.

FIG. 4 is a diagram showing further detail of the ground station 210 and the base stations 112. A signal having the data transmitted from the satellite is sensed by the ground station antenna 402 and detected and demodulated by the satellite receiver 404. The data is then provided to a processor 408 in the base station 112. The processor 408 provides the data to the transmitter 412 and thence to the base station 112 antenna 410. The data is then transmitted to the DRPD 310. The ground station 210 can also include sufficient cache to store data received from the satellite 206. The ground station processor and cache can be embodied in a server, or into the base station equipment.

The present invention can also be used to provide for increased throughput from users to the PSTN/IB 106 and elsewhere. This embodiment is also illustrated in FIG. 4. Signals from the DRPD 310 are transmitted to the base station 112, antenna 410 and provided to the receiver 414. The processor 408 processes the data to perform any data conditioning or compression, and provides the data to the satellite transmitter 416. The satellite transmitter 416 uplinks the data to the satellite 206. The satellite 206 receives the information and transmits the information to a downlink facility communicatively coupled to the data destination. In one embodiment, transmission of the data from the ground station is accomplished through the PSTN/IB 106.

Figure 5:
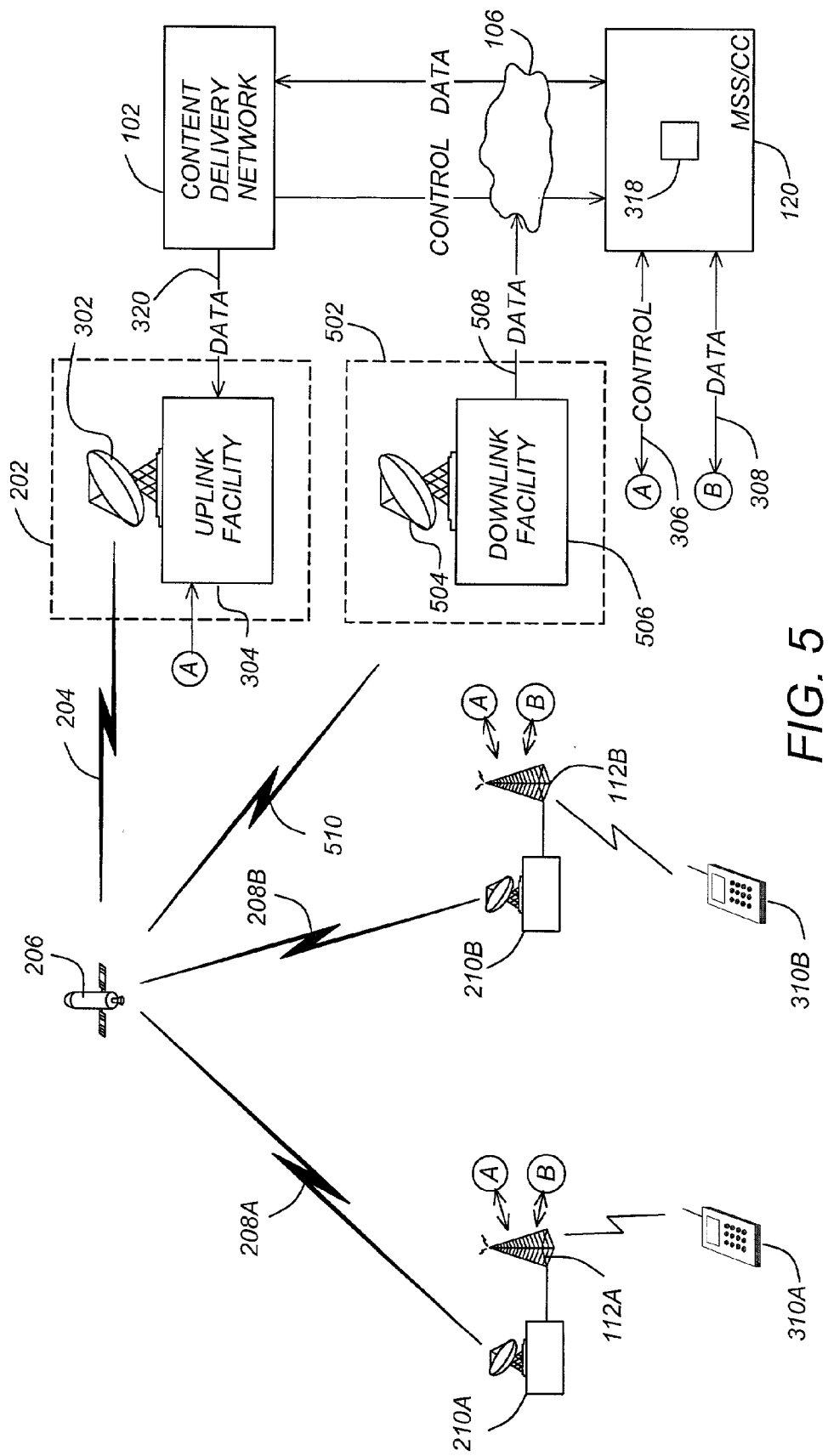
FIG. 5 is a system level diagram of an embodiment of the augmented wireless communication network using the satellite segment to transmit data from the users to desired destinations.

FIG. 5 is a system level diagram of an embodiment of the AWCN 200 that uses the satellite segment to transmit data from users to the PSTN/IB 106 and elsewhere. In this embodiment, data is transmitted from the satellite 206 to a downlink station 502. A receiving antenna 504 at the downlink station 502 receives the data, and after processing at the downlink facility 506, the data is provided to the PSTN/IB 106 via communication link 508 for delivery to the appropriate destination. As shown in FIG. 5, all, some, or none of the data may also be transmitted without using the satellite segment (through the unmodified WCN 100).

Figure 6A:
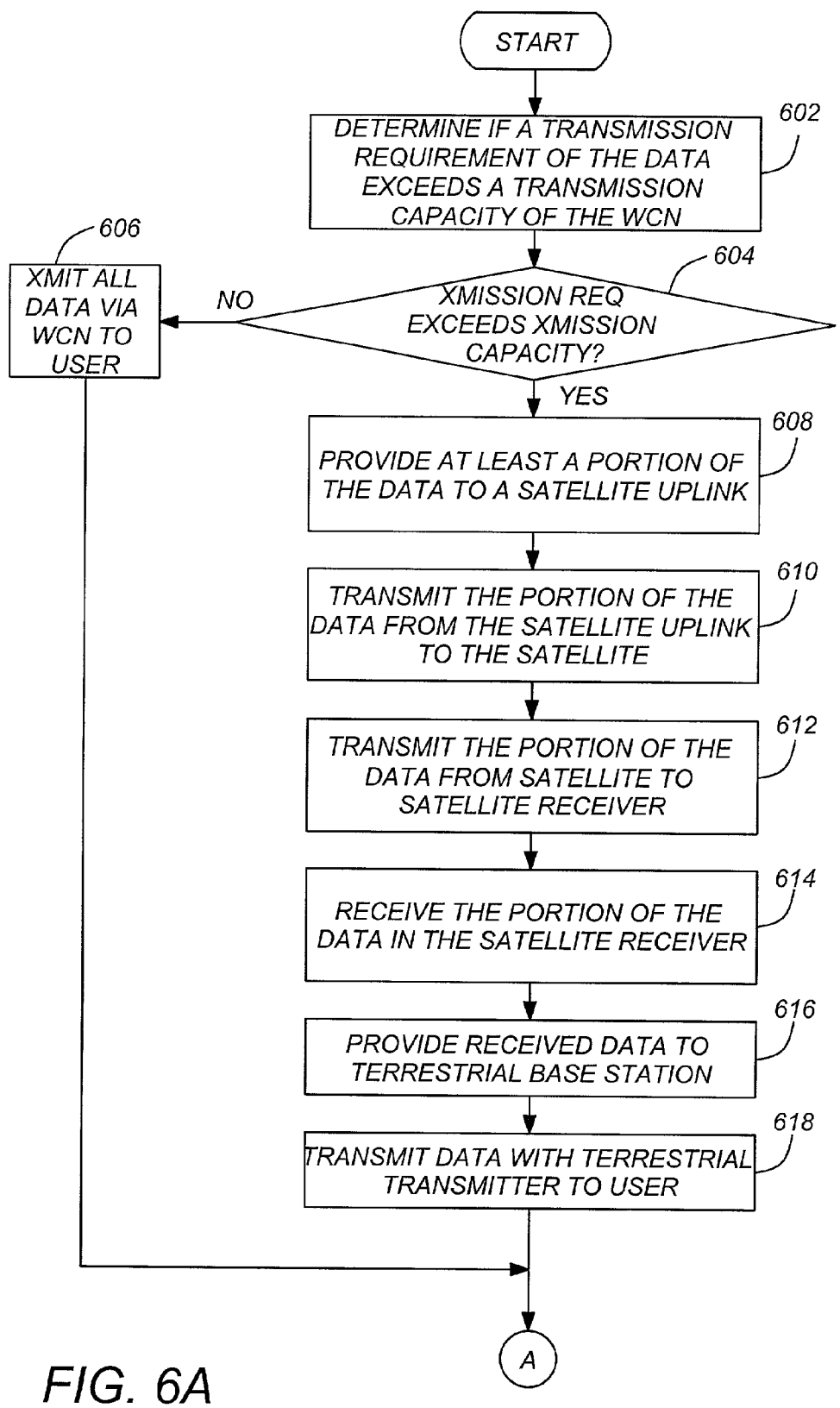
FIGS. 6A and 6B are diagrams showing exemplary method steps used to practice one embodiment of the present invention.

FIG. 6A is a flow chart illustrating exemplary method steps that can be used to perform one embodiment of the present invention. Data to be provided to the user is examined to determine if a transmission requirement of the data exceeds the transmission capacity of the WCN 100 (e.g. the AWCN 200 without the satellite segment). This is shown in block 602. If the transmission requirement does not exceed the transmission capacity, all of the data is transmitted by the WCN 100, as shown in blocks 604 and 606. If the transmission requirements for the data exceed the transmission capacity, at least a portion of the data is provided to a satellite uplink, as shown in block 608. As shown in blocks 610 and 612, the portion of the data is transmitted from the satellite uplink to the satellite 206, and then to the satellite receiver 404. The data is then received in the satellite receiver 404, and provided to the terrestrial transmitter 412, as shown in blocks 614, and 616. The data is then transmitted to the user by the terrestrial transmitter 412.

As described herein, data portions to be transmitted via the satellite segment and the ground segment (existing WCN 100) can be allocated according to an optimization other than the foregoing scheme. For example, rather than transmit data portions via the satellite segment only when the existing WCN 100 cannot meet the data transmission requirements, the allocation between the existing WCN 100 and the satellite segment can be performed to minimize cost, or maximize throughput.

Figure 6B:
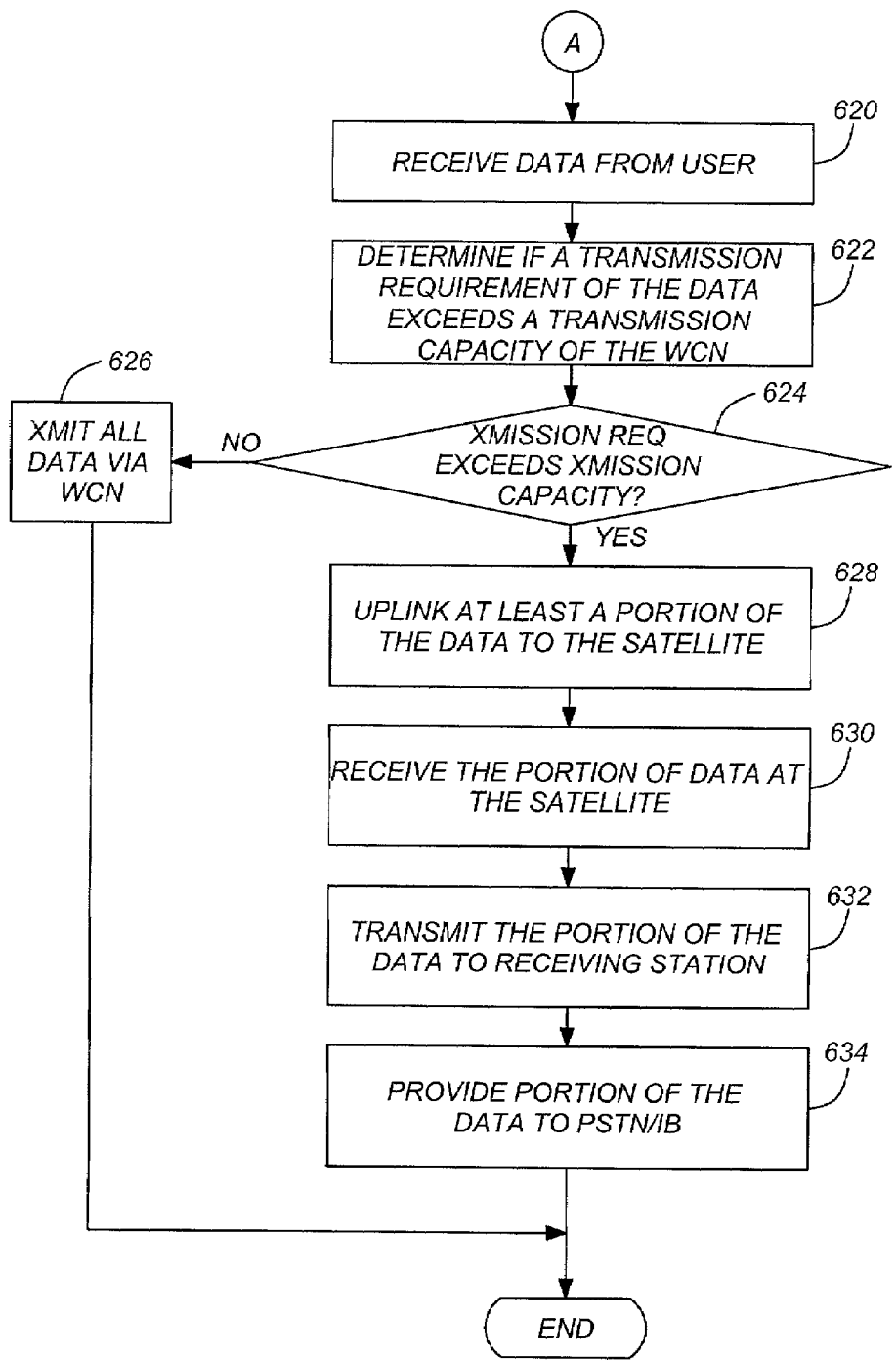

FIG. 6B is a flow chart illustration exemplary method steps used to practice another embodiment of the invention which permits the satellite segment to be used to transmit data from the user to the PSTN/IB 106 and other destinations. In block 620, data is received from the user at the receiver 414. A determination is made regarding whether a transmission requirement of the data exceeds the capacity of the WCN 100. If not, the data may be transmitted via the WCN 100 as shown in blocks 622–626. If the transmission requirement of the data exceeds the transmission capability of the WCN 100, at least a portion of the data is provided to the satellite transmitter 416 and is then transmitted or uplinked to the satellite 206. This is illustrated in block 628. The- data portion is received by the satellite 206 and transmitted to a downlink facility or receiving station 502, and thereafter provided to the PSTN/IB106.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of providing digital data to a data reception device, comprising:
    (a) operating the data reception device in a wireless communication network comprising a plurality of terrestrial receivers and terrestrial transmitters, each serving a service region,
    (b) receiving at least a portion of the digital data in a satellite receiver via a satellite communication system;
    (c) providing the received portion of the digital data to at least one of the terrestrial transmitters; and
    (d) transmitting the received portion of the digital data to the data reception device within the service region using the terrestrial transmitter while transmitting a remainder of the digital data via the wireless communication network;
    (e) determining if a transmission requirement of the digital data exceeds a capacity of the wireless communication network; and
    (f) performing steps comprising steps (b)through (d) only if the transmission requirements of the digital data exceed the capacity of the wireless communication network.

2. The method of claim 1, wherein the satellite receiver is communicatively coupled to the terrestrial transmitter.

3. The method of claim 1, wherein the wireless communication network is a cellular telephone network.

4. The method of claim 1, wherein the step of determining if a transmission requirement of the portion of the digital data exceeds a capacity of the wireless communication network comprises the steps of:
  determining the transmission requirement for the portion of the digital data;
  determining the transmission capacity of the wireless communication network; and
  comparing the transmission requirements for the digital data with the transmission capacity of the wireless communication network.

5. The method of claim 4, further comprising the steps of:
  providing the portion of the digital data to a satellite uplink, uplinking the portion of the digital data from the satellite uplink to a satellite, and transmitting the digital data only if the transmission requirements of the portion of the digital data exceed the capacity of the wireless communication network.

6. The method of claim 4, wherein the transmission requirement comprises a minimum bandwidth.

7. The method of claim 4, wherein the transmission requirement comprises a size of the media program.

8. The method of claim 4, wherein the transmission requirement comprises a quality of service (QoS) parameter.

9. The method of claim 4, wherein the transmission requirement comprises a cost of service parameter.

10. The method of claim 4, further comprising the steps of:
  receiving information describing in which service region the user is located; and
  transmitting the digital data only to a satellite receiver associated with the service region in which the data reception device is located.

11. An apparatus for providing digital data to a data reception device, comprising:
  a wireless communication network comprising a plurality of terrestrial receivers and terrestrial transmitters for transmitting information to the data reception device, each serving a service region;
  means for receiving a portion of the digital data in a satellite receiver in a satellite communication system;
  means for providing the received portion of the digital data to at least one of the terrestrial transmitters for transmission to the user; and
  means for transmitting the received portion of the digital data to the data reception device within the service region using the terrestrial transmitter while transmitting a remainder of the digital data via the wireless communication network;
  means for determining if a transmission requirement of the digital data exceed a capacity of the wireless communication network; and
  means for providing the portion of the digital data to at least one of the terrestrial transmitters only if the transmission requirements of the digital data exceed the capacity of the wireless communication network.

12. The apparats of claim 11, further comprising means for transmitting the portion received digital data to the user within the service region using the terrestrial transmitter.

13. The apparatus of claim 11, wherein the wireless communication network is a cellular telephone network.

14. The apparatus of claim 11, wherein the means for determining if a transmission requirement of the digital data exceeds a capacity of the wireless communication network comprises:
  means for determining the transmission requirement for the digital data;
  means for determining the transmission capacity of the wireless communication network; and
  means for comparing the transmission requirements for the digital data with the transmission capacity of the wireless communication network.

15. The apparatus of claim 11, further comprising:
  means for providing the digital data to a satellite uplink, uplinking the digital data from the satellite uplink to a satellite, and transmitting the digital data only if the transmission requirements of the digital data exceed the capacity of the wireless communication network.

16. The apparatus of claim 11, wherein the transmission requirement comprises a minimum bandwidth.

17. The apparatus of claim 11, wherein the transmission requirement comprises a size of the media program.

18. The apparatus of claim 11, wherein the transmission requirement comprises a quality of service (QoS) parameter.

19. The apparatus of claim 11, wherein the transmission requirement comprises a cost of service parameter.

20. The apparatus of claim 11, further comprising:
  means for receiving information describing in which service region the data reception device is located; and
  means for transmitting the digital data only to a satellite receiver associated with the service region in which the data reception device is located.

21. An apparatus for providing digital data to a user, comprising:
  a wireless communication network transmitting digital data to a data reception device, the wireless communication network comprising a plurality of terrestrial receivers and terrestrial transmitters for transmitting the digital data to the data reception device, each serving a service region,
  a satellite antenna, for receiving a signal from a satellite, the signal including a portion of the digital data; and
  a satellite receiver communicatively coupled to the satellite antenna for detecting and demodulating the signal to produce the portion of the digital data, the satellite receiver communicatively coupled to the terrestrial transmitter, while the wireless communication network transmits a remainder of the digital data to the user; and
  a processor for determining if a transmission requirement of the digital data exceed a capacity of the wireless communication network; wherein the portion of the digital data is provided to at least one of the terrestrial transmitters only if the transmission requirements of the digital data exceed the rapacity of the wireless communication network.

22. The apparatus of claim 21, wherein the communication network is a cellular telephone network.

23. The apparatus of claim 21, wherein the satellite antenna is disposed within the service region.

24. The apparats of claim 21, wherein the satellite antenna is disposed proximate the terrestrial transmitter.

* * * * *